H. T. KRAKAU.
DRAFT GEAR.
APPLICATION FILED MAR. 24, 1908.

900,027.

Patented Sept. 29, 1908.
7 SHEETS—SHEET 4.

Fig. 4.

WITNESSES
R A Balderson
W. W. Swartz

INVENTOR
H. T. Krakau.
by Bakewell, Byrnes & Parmelee,
his Attys.

H. T. KRAKAU.
DRAFT GEAR.
APPLICATION FILED MAR. 24, 1908.

900,027.

Patented Sept. 29, 1908.
7 SHEETS—SHEET 5.

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

DRAFT-GEAR.

No. 900,027.

Specification of Letters Patent.   Patented Sept. 29, 1908.

Application filed March 24, 1908.   Serial No. 422,889.

*To all whom it may concern:*

Be it known that I, HARRY T. KRAKAU, of Cleveland, in the county of Cuyahoga and State of Ohio, have invented a new and useful Draft-Gear, of which the following is a full, clear, and exact description, reference being had to the accompanying drawings, forming part of this specification, in which—

My invention provides a draft-gear in which the coupler is capable of swinging laterally through a wide range and is connected to the truck so as to be guided thereby positively into proper position. The device can be used with success on passenger cars, and can also be applied to draft-gears in a manner which will adapt them for use not only with passenger cars, but also with much greater efficiency than heretofore on freight car equipments. The advantages of such laterally-swinging draft-gears are, that they relieve the cars from the great strain to which they are subjected when provided with laterally fixed draft-gears, and also remove strain from the wheels, axles, and track, and thus increase the durability of the cars and effect a very considerable economy in the power required to move the trains.

The drawings show the preferred embodiment of my invention, but it will be understood by those skilled in the art that the parts and their arrangement may be modified in many ways and that some of the parts of the apparatus may be applied to use without the others.

In the drawings, 2 represents the car-coupler, which has a long rear extension preferably made in the form of a shank 3 which terminates at the end in a socket 4 for a vertical pivot-pin 5. For convenience, I prefer to make the coupler-shank in two parts 3' and 3ª, the rear portion 3' being provided with the socket or pin-hole 4 and being forked at its forward end so as to fit the sides of the forward portion 3ª. The socket 4 fits within a yoke 6 to which it is attached by the pivot-pin 5, and the yoke is mounted between draft-irons 7, 7, followers 8 being set crosswise within the yoke and adapted to bear against stops 9 on the irons. A spring or springs 10 is interposed between the followers and with the followers constitutes the draft-rigging. Any suitable kind of draft-rigging may be employed.

When the car is in service, the coupler and its shank will turn radially on the axis of the pin 5, being guided by means described below, so that it will at all times be in approximately the central portion of the railway track. The yoke, however, does not turn but remains in the longitudinal axis of the car, and as the coupler is subjected to the pressure of buffing and draft, the forward follower will be forced back against the spring or the rear follower drawn forward against the spring as the case may be, the forward stops 9 resisting the force of draft and the rear stops 9 resisting the force of buffing.

Figure 1:
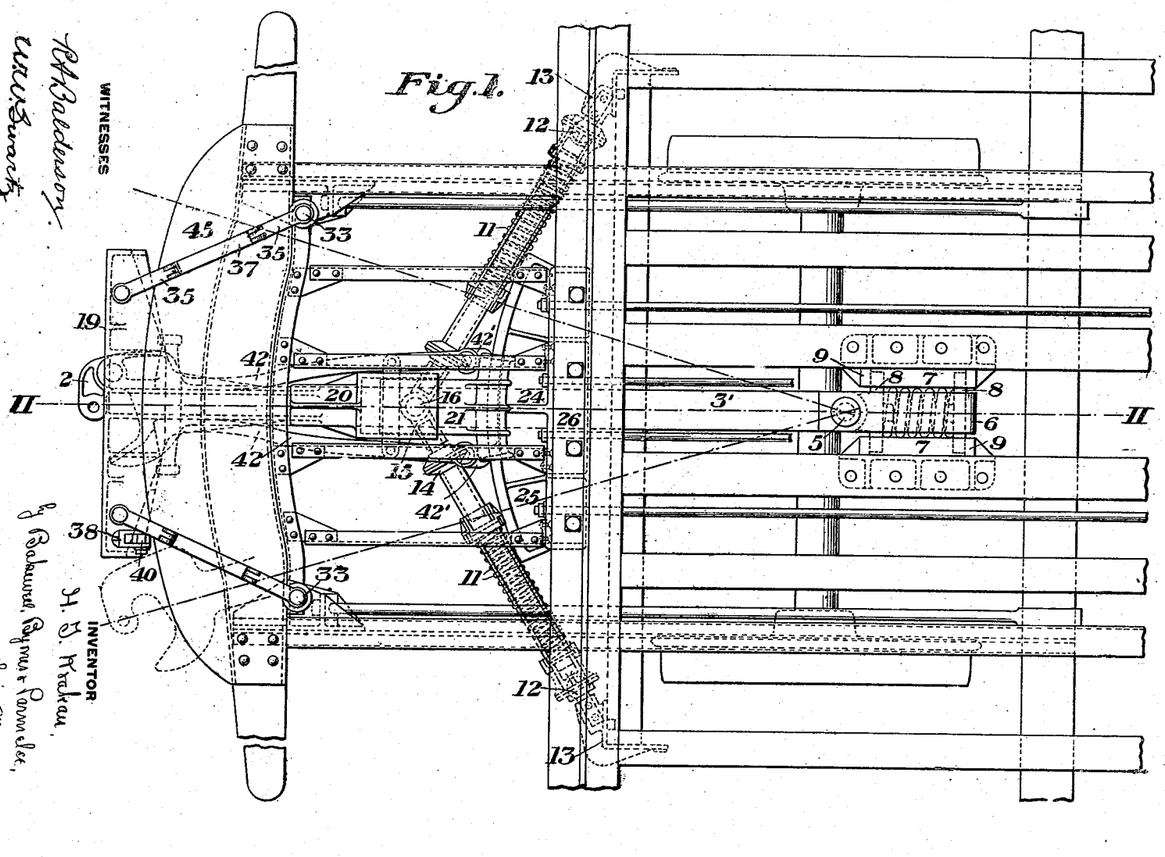
Figure 1 is a plan view of the draft-gear.
Figure 2:
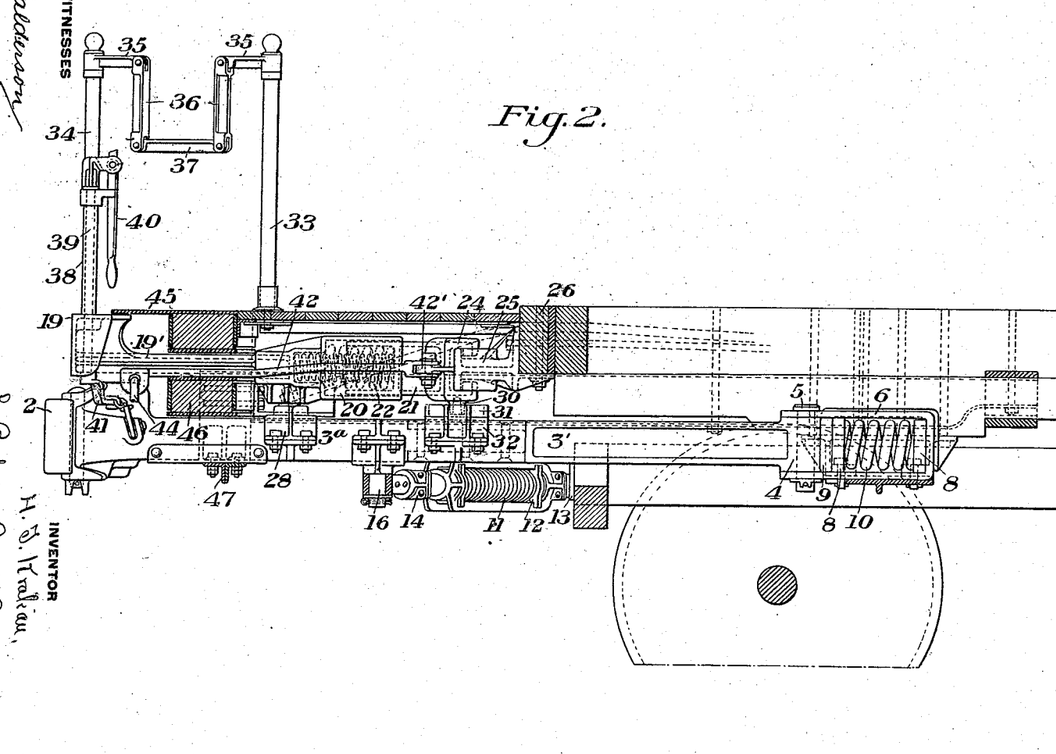
Fig. 2 is a vertical longitudinal section on the line II—II of Fig. 1.
Figure 3:
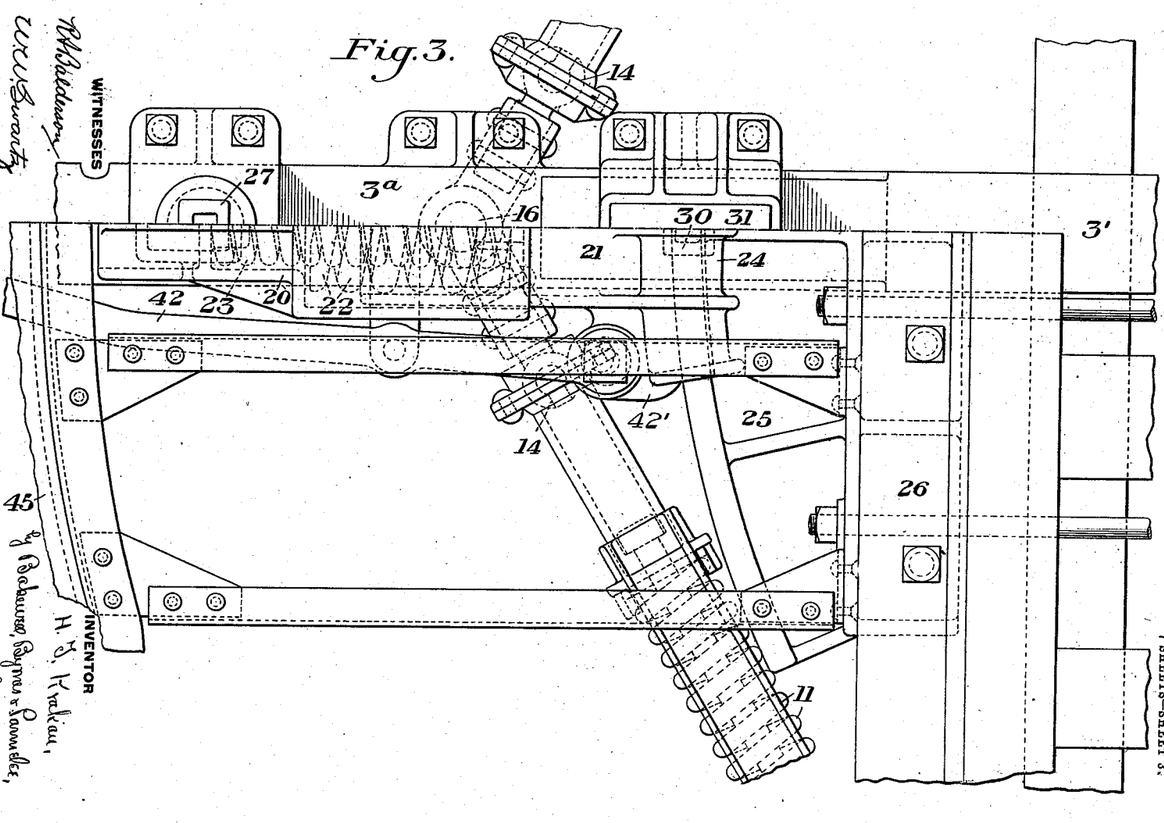
Fig. 3 is a plan view on a larger scale, showing the guiding connections between the swinging draft-gear and the truck, and also showing the details of the platform-buffer and its application to the car-body.
Figure 4:
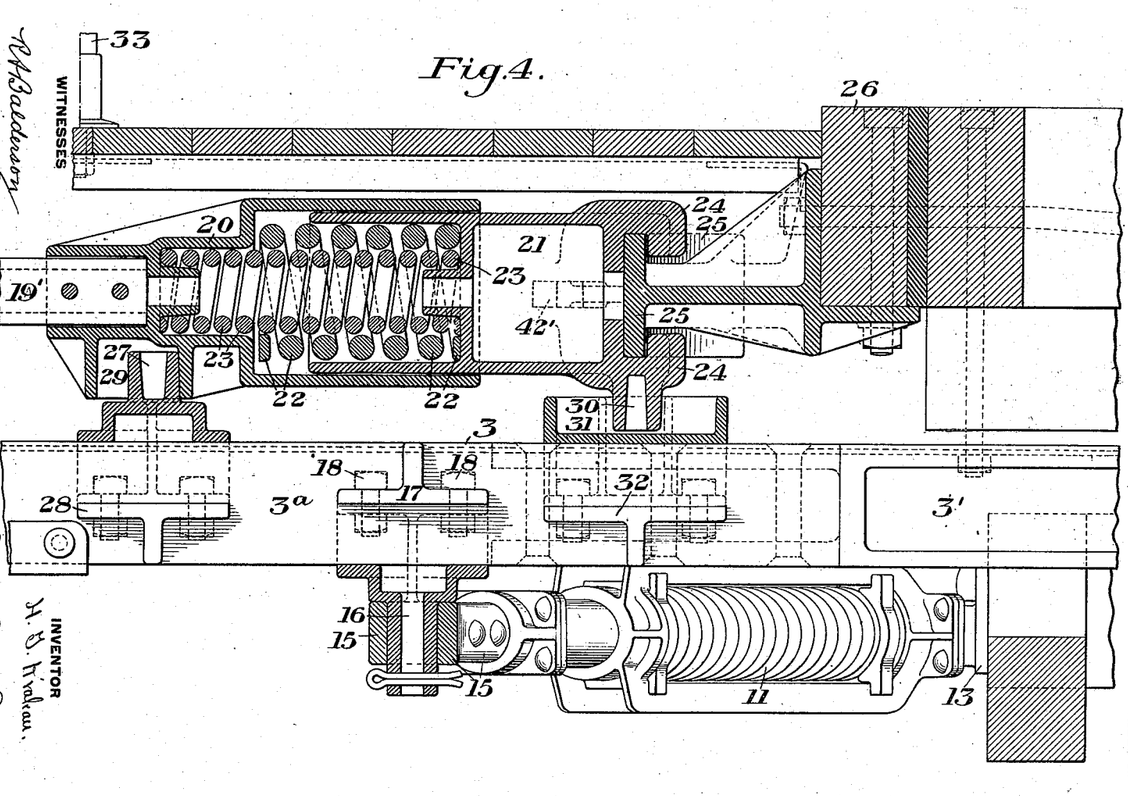
Fig. 4 is a vertical longitudinal section of parts shown in Fig. 2, but on a larger scale.

To guide the coupler-shank and to hold it substantially at the center of the track I provide it with guiding-rods shown in Figs. 3 and 4, which are made with telescopically-arranged sections having interposed springs 11. At their rear ends these rods are connected by ball-and-socket joints 12 to brackets 13 at the ends of the truck, and at their forward ends the rods are connected by ball-and-socket joints 14 with an elbow-lever or like connection 15, mounted at the middle on a vertical pin 16 which projects downwardly from the coupler-shank and is preferably connected therewith by a pad 17 and bolts 18. The mode of attachment of the pin 16 to the coupler shank is not a limiting feature of my invention. The elbow-lever connects the guiding-rods to the coupler-shank in such manner that tension exerted upon it on either side will turn it and keep its arm on the other side in the proper line, and the ball-and-socket joints afford the necessary flexibility to the parts.

Figure 5:
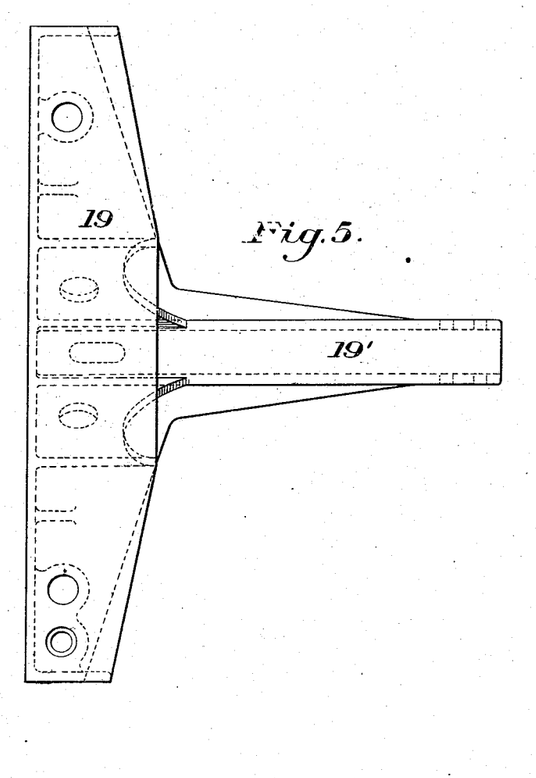
Fig. 5 is a plan view of the face-piece of the buffer.

The drawings show the application of my invention to passenger cars, and therefore platform-buffers are provided which are constructed in accordance with my invention so that they will move laterally with the coupler-shank and thus will be maintained in engagement with each other in all positions of the car. The platform-buffer consists of three parts,—a forward part or face-piece 19, shown in detail in Fig. 5, with a straight face and a rearwardly-projecting shank 19', secured to a front buffer spring case 20; the part 20 constitutes the second member of the platform-buffer and is fitted telescopically over the rear buffer-spring case, which constitutes the third member of the device. Springs 22, 23 are set in the spring-cases, these springs being preferably two in number and the inner coil 23 longer than the outer coil and set in place under compression, so that, when the coupler is pulled out against its draft-spring 10, as explained below, the inner coil will force the face of the buffer forward and will keep the opposing buffers in close contact, thus preventing an intervening gap.

Figure 6:
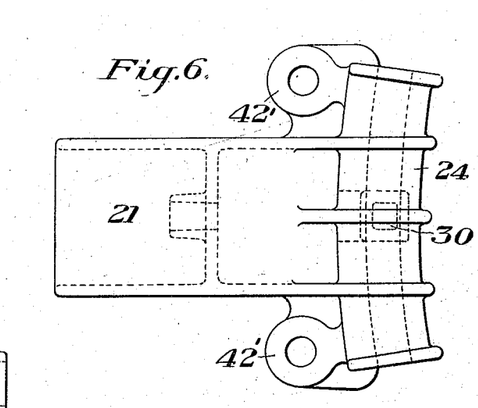
Fig. 6 is a plan view of the section which forms the guide and spring-holder for the rear end of the buffer.
Figure 7:
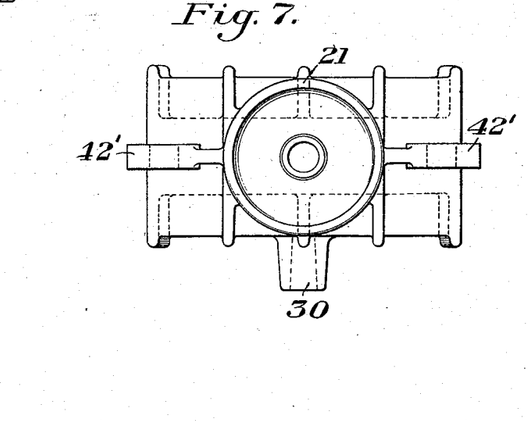
Fig. 7 is a front view of the parts shown in Fig. 6.

The rear spring-case 21, shown in detail in Figs. 4, 6 and 7, has a curved and flanged end portion 24, which fits upon a correspondingly curved segment 25, the front of which is preferably of T-shape in cross-section and the curvature such that its center will be substantially coincident with the pivotal axis of the coupler-shank. Its body is secured to the end-sill 26 or other part of the car-frame back of the end sill of the platform. The buffer face is so mounted as to be maintained at right angles to the shank of the coupler, this being accomplished preferably by making the buffer face rigid with respect to lateral motion in its connection with its shank and spring-cases so that it is substantially incapable of rocking or rotating on its shank and is thus held at right angles to the shank of the coupler.

The buffer is engaged with the coupler-shank in such manner as to permit an independent relative longitudinal motion of these parts to a limited extent, and so as to cause them to move laterally together. This engagement is made by pins or projections on one of these parts, fitting within longitudinally slotted or elongated sockets on the other part, one pair of these engaging devices being at the rear of the buffer, and preferably as near to its guiding-segment as possible, and the other being placed at a forward point, so that by applying lateral motion to the buffer at front and back points simultaneously, it is moved laterally with the coupler with as little friction and liability of binding as possible. The buffer being thus moved at its rear and forward points with the coupler, constitutes in effect a floating member which has its rear bearing on a curved and extended surface at the end-sill of the car-frame, and transmits the stresses of buffing to the end-sill in a straight line in every position in which it may be carried by the coupler. The strains are thus distributed on the car-frame in a most advantageous manner. The buffer by bearing at its rear end against the end-sill of the car-frame, instead of near the forward end of the buffer on the front of the platform, creates a minimum of friction on its bearing to be overcome in its lateral movement.

Figure 8:
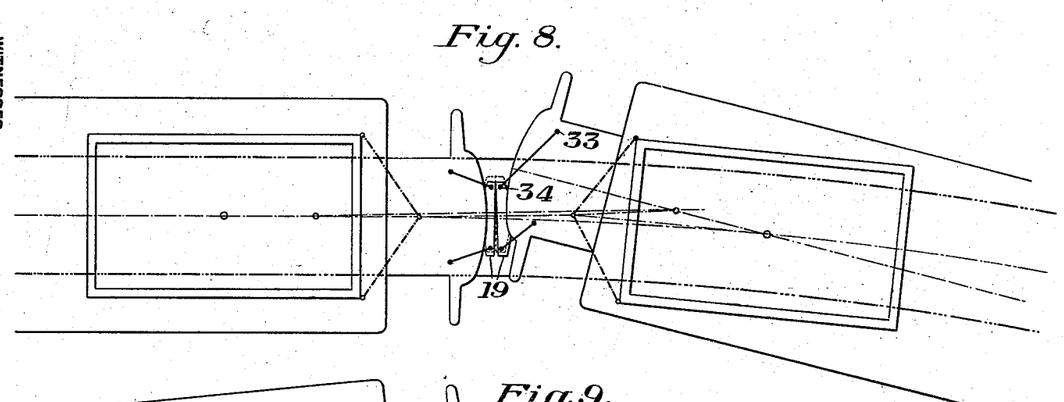
Fig. 8 is a diagrammatic view illustrating the relative positions of the buffers, with one car on a curve and the other car on a tangent to the curve.
Figure 9:
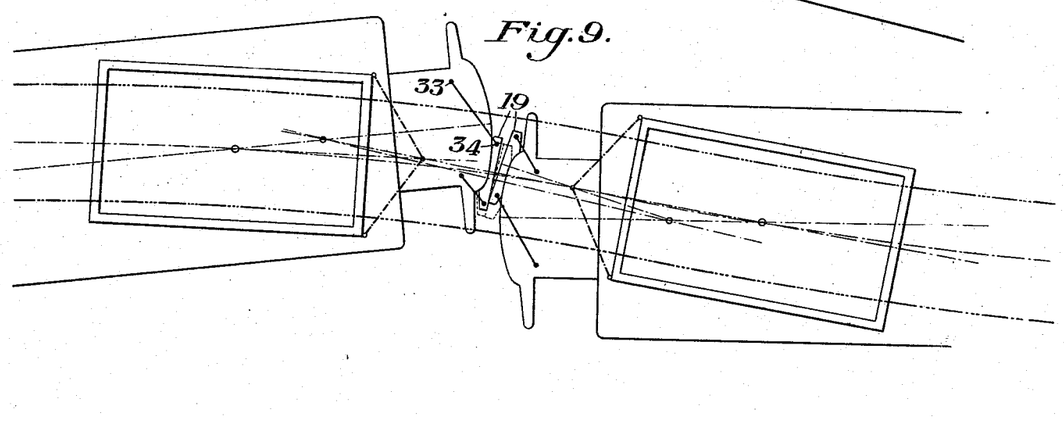
Fig. 9 is a diagrammatic view illustrating the relative positions of the buffers with the cars on a reverse curve but not at the middle point of the reverse curve.
Figure 10:
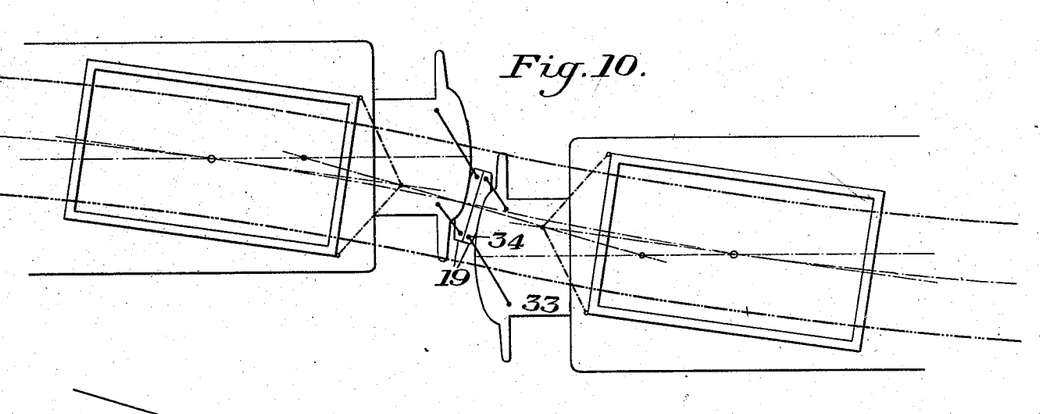
Fig. 10 is a diagrammatic view illustrating the relative positions of the buffers when the cars are at the middle point of a reverse curve.
Figure 11:
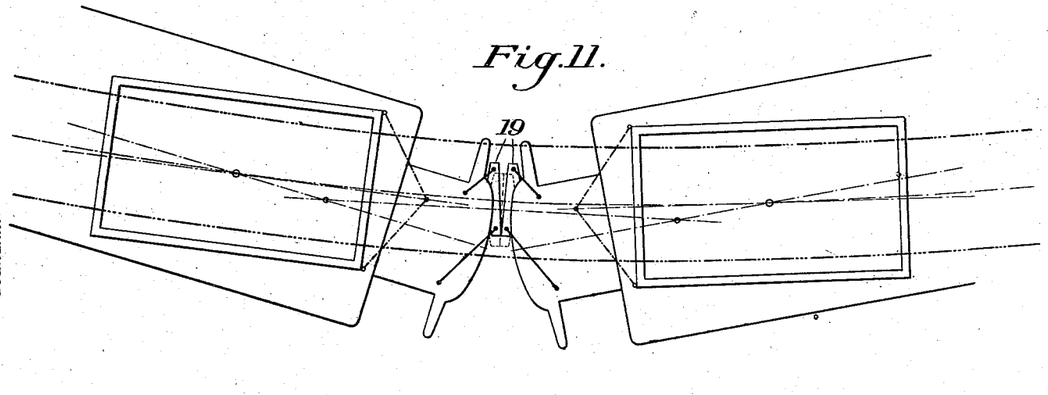
Fig. 11 is a diagrammatic view illustrating the relative positions of the buffers when the cars are on a continuous curve.

The engaging members of the buffer and coupler which I show in the drawing, consist of a forward pin 27 secured to a pad 28 on the coupler-shank, and fitting within an inverted and elongated socket 29 on the section 20 of the buffer. This device serves also as a stop to prevent longitudinal removal of the buffer. The rear engaging member is constituted by a downwardly-projecting pin 30 on the part 24 fitting within a socket 31 secured by a pad 32 to the coupler-shank. This pin 30 is preferably placed directly under the segment 25, so as to insure the proper sliding motion of the buffer on the segment without danger of cramping, and the sockets 29 and 30 are preferably made only a little wider than the diameter of the pins, so that they will not allow independent lateral movement of the parts, but will permit independent longitudinal movement. The clearance for the forward pin 27 in its socket 29 is, however, preferably slight, so that if during buffing there is any tendency for the buffers to move sidewise and allow the couplers to buckle, such buckling tendency will be restrained by the action of the couplers locked together, because the engaging devices prevent the couplers from pulling away from their respective buffers. As long as the buffers are thus held in engagement they cannot move sidewise relatively to each other. The tendency to buckle is likewise prevented by the action of the buffers on each other. The buffer has a wide buffing face which is always held rigidly at right angles to the longitudinal axis of its own shank and to that of the coupler, because the buffer is not provided with ordinary springs, one on either side of the buffer, which allow one side to be compressed even though the other side may not be, but it is provided with a shank which is integral with the buffing face and which acts upon one central spring mechanism. For this reason, so long as two buffers are in contact and under buffing strain their shanks cannot get out of line with each other and as the cars are pushed over the varying curvature of the track they will force each other laterally on their respective car-bodies and thus maintain their shanks in the same line. As each buffer engages its coupler, and one is thus prevented from moving laterally without, or forced to move laterally with, the other, the couplers will be held in line also and prevented from buckling. This action of the buffers on each other assists the truck connections in moving the couplers laterally when the curvature of the track changes. During buffing strains when there may be more or less friction between the rear end of the buffer and its bearing on the car-frame it is important that the increased resistance to lateral movement thus produced should not increase the work to be done by the truck connections, but be overcome by the action of the buffers themselves. When two opposing cars meet each other the faces of the opposing buffers 19 will ordinarily be parallel, but in extreme cases, as shown in Figs. 8, 9 and 11, when the faces are slightly inclined to each other as they come together, they will adjust themselves in contact by forcing the buffers laterally until their faces make contact throughout their breadth, and will thus force the couplers into exact alinement.

As the buffers have considerable lateral motion during the passage of the cars around curves, it is desirable to provide flexible guard-rails between which passengers can walk from one car to the next. The precise form of such guard-rails is not essential to my invention broadly considered, but I prefer to use the means invented by me and shown in Figs. 2, 8 to 11. I employ upright posts 33, 34, the rear post being fixed to the car-body and the forward post being fixed to the buffer-section 19. These posts are connected by jointed rail-sections 35, 36 and 37, the horizontal sections 35 being swiveled on the upper ends of the posts, the vertical sections 36 being pivoted to the ends of the sections 35 and depending therefrom, and the section 37 connecting the ends of the sections 36. The necessary lateral motion of these jointed rails is afforded by the swiveling of the horizontal sections 35, and the elongation of the rails is provided for by the jointed sections 36 and 37, but they are laterally inflexible. The manner of operation when in use is shown in diagram in Figs. 8 and 11.

For the purpose of operating the lock of the coupler, I employ a hollow post 38 which is mounted on the buffer-section 19 and has a vertical shaft 39 extending through it. This shaft has, at its upper end, an operating lever 40, and at its lower end a crank 41 for attachment to the coupler-lock mechanism so that as the shaft moves with the coupler and buffer in their lateral travel, it will always be in proper position for successful operation.

My invention also affords means for the use of safety-chains and rods, by which the cars are connected so that in the event of breaking of the couplers the cars will not part. For this purpose, I employ rods 42, connected at their rear ends to lugs 42' on the section 21 of the buffer and thence extending forwardly and terminating just back of the face of the buffer, the safety-chains 44 being attached to the ends of the rods. This affords an attachment for the safety chains which the lateral movement of the ends of the car-bodies will not disturb.

It will be noticed that the platform of the car is provided with a projecting fixed cover-plate 45 which serves as an apron to cover the gap between the top of the buffer and the platform on which the passengers step as they pass from one car to the next. This plate in my device is made sufficiently wide to afford a cover for the buffer in its most extreme lateral positions, and is preferably curved substantially concentrically with the pivotal point of the coupler. My buffer is relatively narrow, and the passengers can step over the center of the buffer no matter how much it is swung to one side.

The buffer is provided with a carry-iron 46, and the coupler with an independent carry-iron 47.

Those features of my invention which are not herein specifically claimed, form the subject-matter of other applications filed and to be filed.

I claim:—

1. A laterally-swinging draft-member mounted on the car-body, and a floating-buffer having a rear bearing against an extended buffing surface and engaged with the draft-member with which it is moved laterally along said surface; substantially as described.

2. A laterally-swinging draft-member mounted on the car-body, and a floating-buffer having a rear bearing against an extended curved buffing surface and engaged with the draft-member with which it is moved laterally along said surface; substantially as described.

3. A laterally-swinging draft-member mounted on the car-body, and a floating-buffer having a rear bearing against an extended buffing surface and engaged with the draft-member with which it is moved laterally along said surface, said buffer being engaged with the draft-member at points near the buffing surface and forward thereof; substantially as described.

4. A laterally swinging draft member mounted on the car body and having a draft spring, a laterally swinging buffer, an extended buffing surface, the buffer having a rear bearing against the extended buffing surface, and a buffer spring, said buffer being engaged with the draft member by engaging devices permitting independent rear movement of the buffer and transmitting rear movement of the draft member to the buffer spring, substantially as described.

5. A laterally swinging draft member and buffer and a rear sliding buffing bearing for the buffer on the car frame back of the front end of the car platform.

6. A laterally swinging draft member mounted on the car body, and a laterally swinging T-shaped buffer engaged with the draft member and having its shank rigid with the transverse member of the buffer, a buffer spring, and an extended rear buffer-bearing surface back of the front end of the platform, substantially as described.

7. A laterally-swinging draft-member mounted on the car-body, a laterally-swinging buffer mounted at its rear end on a curved segment fixed to the end-sill of the car frame back of the front end of the platform, and a connection between the draft-member and buffer; substantially as described.

8. A laterally swinging T-shaped buffer having its shank rigid with the transverse member and constructed to have a rear bearing against an extended buffing surface, and provided with two sections having an interposed spring, substantially as described.

9. A swinging draft member pivoted on the car body, and a laterally swinging buffer engaged with the draft member for lateral movement therewith and bearing against a curved surface in advance of the pivot and back of the front end of the car platform, substantially as described.

10. A laterally swinging draft member pivoted on the car frame, a laterally swinging buffer, and safety connections attached to the buffer and moving therewith in its lateral motions, said safety connections adapted to extend forwardly for attachment to an adjoining car, substantially as described.

11. A laterally-swinging spring-buffer, a laterally-swinging coupler mounted independent of the buffer, and a buffer face which is permanently maintained at substantially right angles to the coupler shank; substantially as described.

12. A laterally swinging coupler and a laterally swinging yielding buffer mounted above the coupler, said buffer having a transverse member permanently maintained at substantially right angles to the coupler-shank, substantially as described.

13. A laterally-swinging coupler and buffer having means whereby they are maintained in parallel position, said buffer having a rear laterally-extended bearing on a part of the car-frame back of the front end of the platform, and being adapted to transmit buffing strains in a straight line thereto; substantially as described.

14. A laterally-swinging draft-member and a laterally-swinging buffer mounted independent of the draft-member and engaged therewith, and adapted to engage a corresponding buffer on another car and to restrain the parts from buckling; substantially as described.

15. A laterally-swinging coupler, a swinging buffer mounted independently thereof and engaged therewith for simultaneous swinging movements, the buffer being adapted to engage a corresponding buffer on another car, and means for holding the buffer face at right angles to the coupler during its swinging movement; substantially as described.

16. A laterally-swinging coupler, and a laterally-swinging buffer mounted independently of one another, the coupler and buffer being engaged with each other at a plurality of points; substantially as described.

17. A laterally-swinging buffer provided with a shank and having a rear bearing on the car-frame, a transverse buffer-member rigidly connected with the shank, and a laterally-swinging coupler engaged with the buffer and pivotally mounted on the car-body; substantially as described.

18. A laterally-swinging buffer having a transverse buffer-member, a laterally-swinging coupler, independent springs for the coupler and buffer respectively, and means whereby the transverse buffer-member is constantly held substantially at right angles to the coupler-shank; substantially as described.

19. A laterally-swinging buffer carrying a spring-mechanism, and mounted to swing on a center back of the spring-mechanism, and guiding means whereby the transverse buffer-member is constantly held substantially at right angles to its radius of swinging movement; substantially as described.

20. A laterally swinging coupler and a draft spring therefor, a laterally swinging buffer and spring mechanism for keeping the buffer projected during draft of the coupler, said buffer and coupler being connected, and a transverse member for the buffer being permanently maintained substantially at right angles to the coupler shank.

21. A T-shaped buffer having its transverse member rigidly held at right angles to its shank and extended laterally to engage the transverse member of an opposing buffer and maintain their respective shanks in alinement, substantially as described.

In testimony whereof, I have hereunto set my hand.

HARRY T. KRAKAU.

Witnesses:
HARRY E. ORR,
CHAS. E. POPE.